United States Patent [19]
Lazarou

[11] Patent Number: 5,441,089
[45] Date of Patent: Aug. 15, 1995

[54] GUIDING ASSEMBLY FOR GUIDING A MANUALLY CONTROLLED CUTTING TOOL

[76] Inventor: Jim Lazarou, Lot 1, 1 Killara Road, Cowra NSW 2794, Australia

[21] Appl. No.: 140,025
[22] PCT Filed: Apr. 29, 1992
[86] PCT No.: PCT/AU92/00192
  § 371 Date: Oct. 27, 1993
  § 102(e) Date: Oct. 27, 1993
[87] PCT Pub. No.: WO92/19417
  PCT Pub. Date: Nov. 12, 1992

[30] Foreign Application Priority Data
Apr. 29, 1991 [AU] Australia .................. PK5846

[51] Int. Cl.⁶ .................................................. B27C 7/06
[52] U.S. Cl. .................................... 142/49; 142/38
[58] Field of Search ................ 142/7, 21, 22, 37, 38, 142/49, 55, 1

[56] References Cited

U.S. PATENT DOCUMENTS

| | | | |
|---|---|---|---|
| 652,358 | 6/1900 | Grode | 142/38 |
| 1,487,538 | 3/1924 | Chadek | 142/38 |
| 2,068,625 | 1/1937 | Burton | 142/38 |
| 2,880,767 | 4/1959 | Rodgers | 142/55 |
| 3,277,933 | 10/1966 | Lalli | 142/38 |
| 3,405,745 | 10/1968 | Schoonover et al. | 142/1 |
| 3,768,527 | 10/1973 | Messick | 142/38 |
| 4,256,155 | 3/1981 | Hochstatter et al. | 142/7 |

FOREIGN PATENT DOCUMENTS

| | | |
|---|---|---|
| 2850484 | 11/1984 | Australia . |
| 356784 | 3/1985 | Australia . |
| 2182483 | 6/1985 | Australia . |
| 6112686 | 2/1987 | Australia . |
| 0275775 | 7/1988 | European Pat. Off. . |
| 2142569 | 1/1985 | United Kingdom . |
| 2172534 | 9/1986 | United Kingdom . |
| 9005048 | 5/1990 | WIPO . |

*Primary Examiner*—Steven C. Bishop
*Attorney, Agent, or Firm*—Michael D. Bednarek; Marks & Murase

[57] ABSTRACT

A guiding assembly is described for guiding a manually controlled cutting tool relative to a lathe axis. The guiding assembly includes a longitudinally extending tool rest (12) which can be fixed to a lathe by mounting spigots (17,18) and which is fixed to a longitudinally extending guide (13) along which a cutting tool mount (42) can freely slide. The cutting tool (27) slides freely within the mount (42). A follower (29) is attachable to the cutting tool to follow a template (16) mounted on the tool rest (12).

14 Claims, 3 Drawing Sheets

GUIDING ASSEMBLY FOR GUIDING A MANUALLY CONTROLLED CUTTING TOOL

This invention relates to a guiding assembly for guiding a manually controlled cutting tool.

This invention has particular but not exclusive application to a guiding assembly for guiding a manually controlled tool relative to a lathe axis. The guiding assembly may be utilised to replicate a predetermined shape and for illustrative purposes reference will be made to such application. The guiding assembly has particular application to wood turning but can also be utilised for turning metal or other materials.

Duplicating attachments for lathes, sometimes called lathe copiers, are well known for wood turning. Two types of copiers are conveniently categorised as semiautomatic and manual. Both categories involve positioning a cutter by allowing or causing a follower associated with the cutter to follow a template. When used herein, the term "template" includes reference to a flat two-dimensional template corresponding to the profile of a solid object and to a solid object which is to be replicated.

UK patent 2142569 exemplifies known manual copiers. In known manual copiers the cutter and follower are mounted in a hand-positioned unit which is supported on the lathe bed or workbench or on an auxiliary table attached to the lathe. The user can guide the cutter relative to the template by sliding the hand positioned unit along the workbench to register against a template and effect progressively deeper cuts in the workpiece until the follower fully contacts the template throughout its complete length. Such duplicators are suitable for replicating small and highly detailed spindles in small numbers, but if a larger number of spindles need to be made this system becomes tedious and time-consuming. It is also difficult to obtain a satisfactory smooth surface particularly when working on large production runs of longer spindles, as for example may be required in turning porch railings. Vibration is also frequently a problem because of the absence of support or other stabilising means close to the cutting tip.

EP patent application 0275775 exemplifies one type of known semi-automatic copier. In known semi-automatic lathe copiers the cutter and follower are mounted in a carriage which is mechanically moved in a direction parallel to the workpiece. The cutter is held against the workpiece and the follower held against the template by mechanical means typically in the form of a plunger driven spring or a spring mounted cantilevered arm. Operation of the semi-automatic models requires skill and training and involves two-handed operation with each hand working independently. One hand controls the cutter and pulls outwardly as high spots are approached on the pattern, or pushes inwardly if the spring pressure needs to be increased. The other hand moves the carriage up and down the length of the workpiece by operating an advancing mechanism. Typically the advancing mechanism involves rack and pinion gears, stationery chains or cable and moveable sprockets or pulleys, or stationery sprockets with moveable chains or cable. Chain and cable drive systems need periodic adjustment to maintain required tension and slippage can occur. The chain mechanisms are also prone to become clogged and can become jammed with chips produced during the cutting operation.

It is also known to provide moveable support tools for holding cutting tools on some lathes. These tool supports slide along a suitably designed lathe bed in a manner illustrated for example in International Patent Application WO 90/05048.

Although semi-automatic machines are more convenient than manual machines for multiple replications, they do not provide the "hands-on" feel desired by skilled wood turning craftsmen and perfectionists will frequently use a hand-held chisel to obtain this "hands-on" feel.

Due to this absence of "hands-on" feel and to obtain better surfaces in certain situations, craftsmen sometimes eschew both manual and semi-automatic copiers in favour of hand held tools. However it is difficult for all but the most skilled and experienced workers to control the depth of cut and to prevent vibration when the cutting tool is hand held.

UK patent 2172534 addresses the problem of controlling the depth of cut. However the arrangement disclosed therein has a number of disadvantages. The tool holder of GB 2172534 is prone to vibration due to an absence of support at the cutting tip. Moreover the tool is able to pivot about the tool rest axis under load during turning or by inadvertent lifting by an operator. Such pivoting results in false copying as the distance of the cutting tip from the lathe axis varies when the follower abuts the template at varying inclinations. It is also necessary that an operator using this tool guesses whether the cutting tip is at the lathe centre height. Furthermore the saddle in which the cutting tool is mounted does not capture the tool which consequently lacks stability, and moreover the saddle can become clogged with cuttings thereby further increasing instability and leading to inaccuracies in replication.

The present invention aims to alleviate at least one of the above disadvantages and to provide a guide assembly for guiding a manually controlled cutting tool which will be reliable and efficient in use. Other objections and advantages of this invention will hereinafter become apparent.

With the foregoing and other objects in view, this invention in one aspect resides broadly in a guiding assembly for guiding a manually controlled cutting tool relative to a lathe axis, the guiding assembly including:

a longitudinally extending tool rest;

tool mounting means for mounting a cutting tool for free sliding movement across the rest normal to the lathe axis, and guide means for guiding the tool mounting means for free sliding movement parallel to the lathe axis.

Suitably the tool mounting means captively mounts the cutting tool. The tool mounting means could be a bracket in which the cutting tool freely slides or it could be a clamp for clamping the cutting tool with the clamp being adapted to slide freely normal to the lathe axis. However it is preferred that the tool mounting means includes a sleeve member adapted to slidingly receive the cutting tool. The sleeve member may be adjustable to accommodate varying sized cutting tools or to adjust for wear.

The tool rest may have a cutting tool resting thereon so that the cutting tool is manually controllable to be located and maintained in a desired position relative to the lathe axis, but it is preferred that the mounting means and the tool rest cooperate to maintain the cutting tip of the cutting tool substantially in the horizontal plane containing the lathe axis.

The guiding assembly in accordance with the invention may also include a cutting tool. The cutting tool may be a conventional cutting tool such as a chisel or the like or it may be a cutting tool having a cutting bit with a cutting tip. Preferably the cutting tool includes restraining means for restraining rotation of the cutting tool when seated on the tool rest. The restraining means may be a splined sleeve or saddle, or it may be a keyway. However it is preferred that the restraining means is in the form of a substantially flat shoe.

The tool rest and the guide means may be independently associated with the lathe or may be associated with each other to facilitate assembly. Suitably the tool rest and the guide means constitute opposed frame members of a substantially rectangular frame. The guiding assembly may include template mounting means adapted to mount a template intermediate the tool rest and the guide means.

The guiding assembly may also include follower means operatively associated with the cutting tool for following a template. The position of the follower means relative to the cutting tip of the cutting tool may be fixed but it is preferred that the position of the follower means relative to the cutting tip of the cutting tool is selectively adjustable.

The guiding assembly may be releasably clamped or otherwise releasably fixed to the lathe by releasable fastening means associated with the lathe however it is preferred that the guiding assembly includes locating means for fixedly and releasably locating the guiding assembly relative to the lathe.

The locating means may be tongues adapted to be releasably retained within grooves associated with the lathe or may be other suitable register means adapted to register in cooperating register means on the lathe. However preferably the locating means includes a plurality of mounting spigots.

In a further aspect this invention resides broadly in a guiding assembly for guiding a manually controlled cutting tool relative to a lathe axis to replicate a predetermined shape, the guiding assembly including:

a longitudinally extending tool rest;

tool mounting means for mounting a cutting tool for free sliding movement across the rest normal to the lathe axis;

follower means operatively associated with the cutting tool for following a template, and guide means for guiding the tool mounting means for free sliding movement parallel to the lathe axis.

In another aspect this invention resides broadly in a cutting tool for use with a guiding assembly as defined above, the cutting tool including:

elongated body means adapted to be slidingly received within the tool mounting means;

follower means adapted to be adjustably mounted on the elongated body means;

a handle;

a cutter bit, and releasable holding means for releasably holding the cutter bit.

The releasable holding means may be pivotally mounted on the elongated body means whereby the cutting tip can be aligned relative to the lathe axis at an angle other than normal so that the cutting tool is adapted to cut across the face of a workpiece mounted in a lathe headstock to replicate or form a bowl or the like. Suitably the releasable holding means can also be adapted to hold a router or the like, whereby upon rotation of the router the cutting tool is adapted to replicate or form flutes in a workpiece.

Suitably the cutting tool includes restraining means for restraining rotation of the cutting tool when seated on a longitudinally extending tool rest. The restraining means may be a splined sleeve or saddle, or it may be a keyway. However it is preferred that the restraining means is in the form of a substantially flat shoe.

In a further aspect this invention resides broadly in a method of replicating a predetermined shape, the method including:

providing a guiding assembly as defined above for guiding a cutting tool relative to a lathe axis;

fixedly locating a template corresponding to the predetermined shape in the guiding assembly;

fixedly positioning a workpiece in the lathe;

operating the lathe to rotate the workpiece, and manually guiding a cutting tool as defined above in the guiding assembly so that the follower means traces the outline of the template.

In order that this invention may be more easily understood and put into practical effect, reference will now be made to the accompanying drawings which illustrate a preferred embodiment of the invention, wherein.

Figure 1:
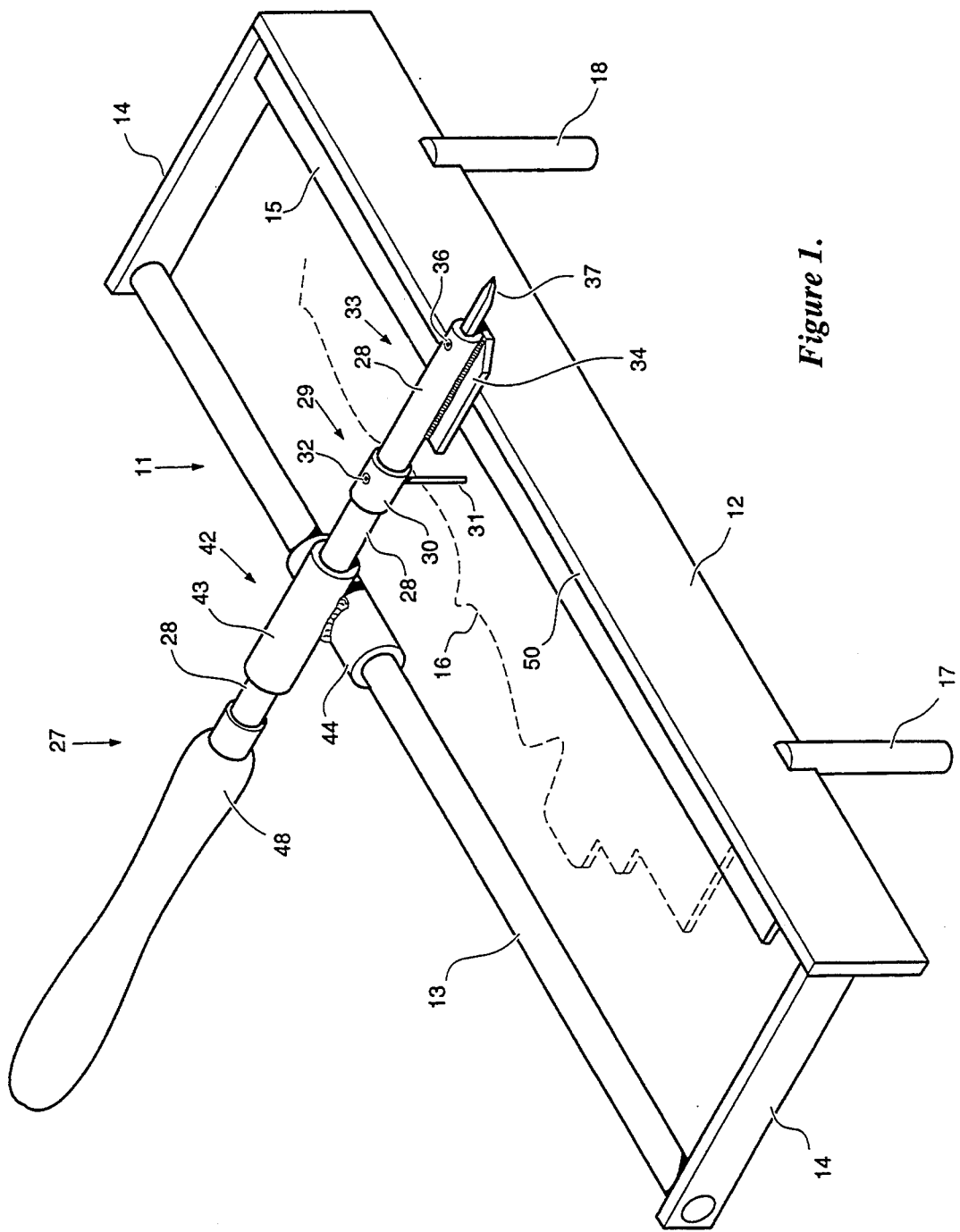
FIG. 1 is a perspective view of a first embodiment of the invention.
Figure 2:
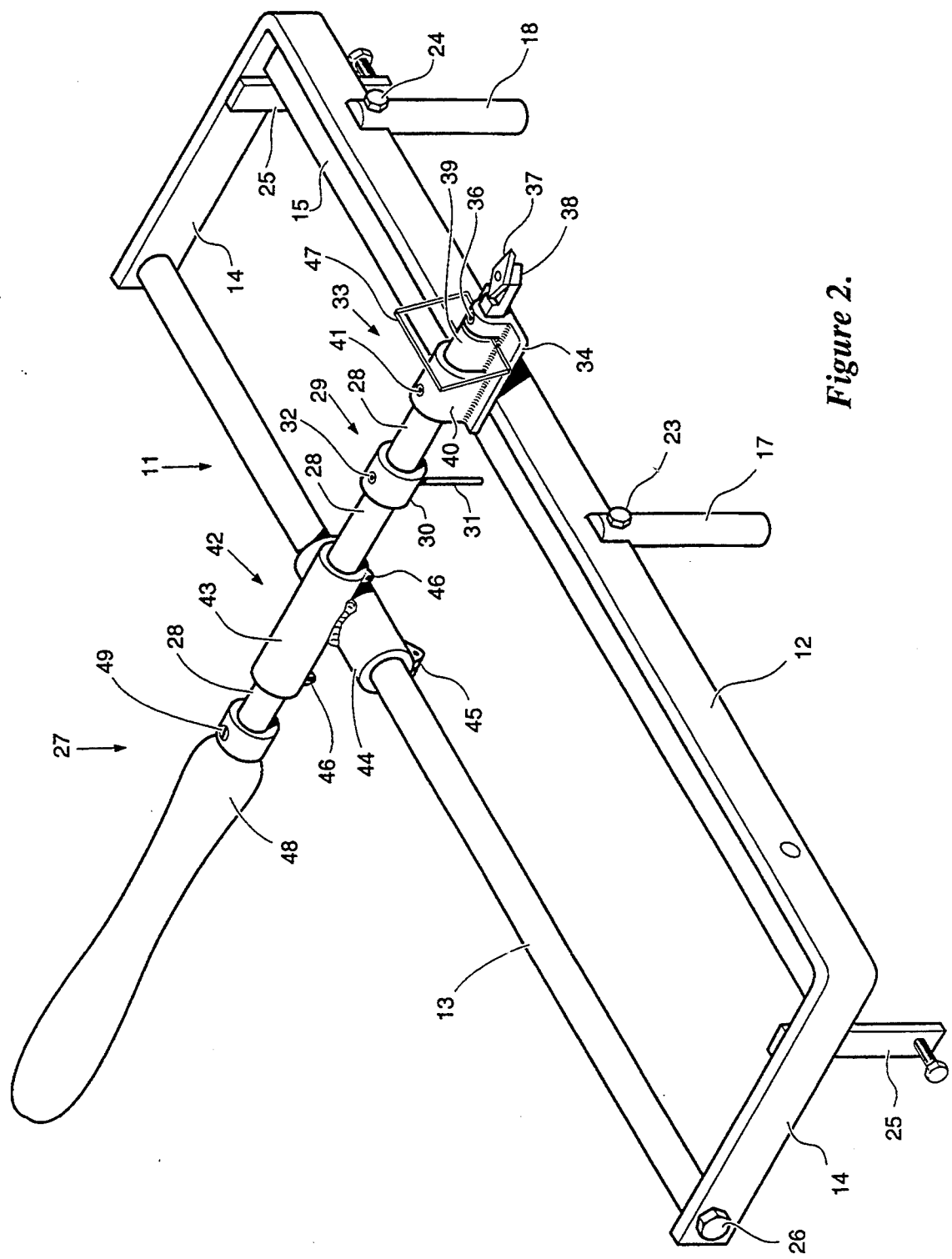
FIG. 2 is a perspective view of an alternative embodiment of the invention.

As can best be seen in FIGS. 1 and 2 the guiding assembly 11 includes a longitudinally extending tool rest 12 in the form of a bar of rectangular cross-section having a rectilinear upper edge surface 50. The tool rest 12 is attached by means of arms 14 to guide means in the form of a longitudinally extending cylindrical shaft 13 attached to the arms 14 by means of bolts 26. The assembly of the tool rest 12, arms 14 and guiding shaft 13 forms a substantially rectangular frame. In the embodiment illustrated in FIG. 2, the arms 14 are extensions of the tool rest 12. A template mounting plate 15 is attached to the inner face of the tool rest 12 and in use a template 16 is mounted on the mounting plate 15 as illustrated in FIG. 1.

Alternatively, as illustrated in FIG. 2, mounting means 25 can be positioned to depend from the arms 14 to provide mounting supports for an article if it is desired that a model be used instead of a flat template. One mount 25 can be located (in a manner not shown) to depend from an adjustable arm (not shown) slideably supported across the tool rest 12 and guide bar 13 and adjustably clamped to either. This arrangement permits articles of differing length to be used as a template.

Figure 3:
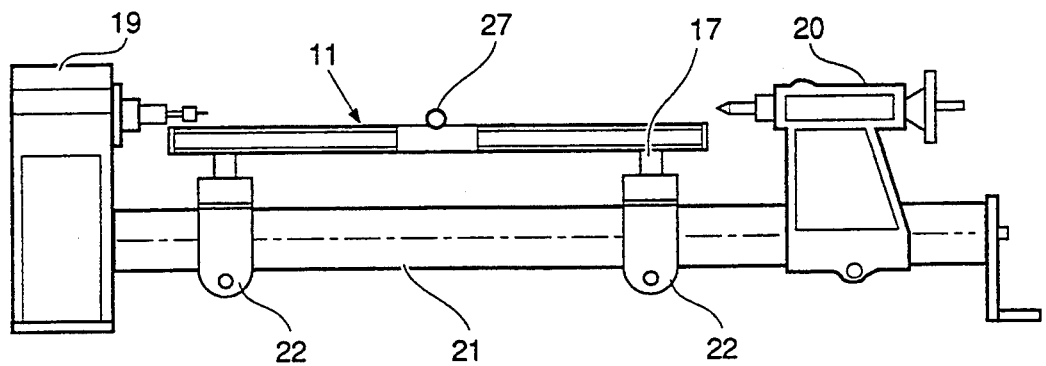
FIG. 3 is a side elevation of the guide assembly positioned on a lathe.
Figure 4:
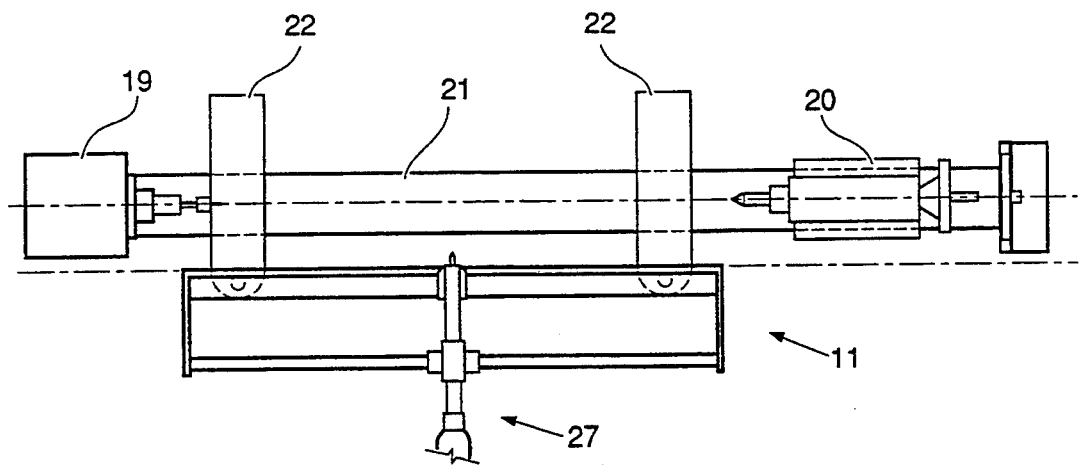
FIG. 4 is a plan view of the arrangement shown in FIG. 3.
Figure 5:
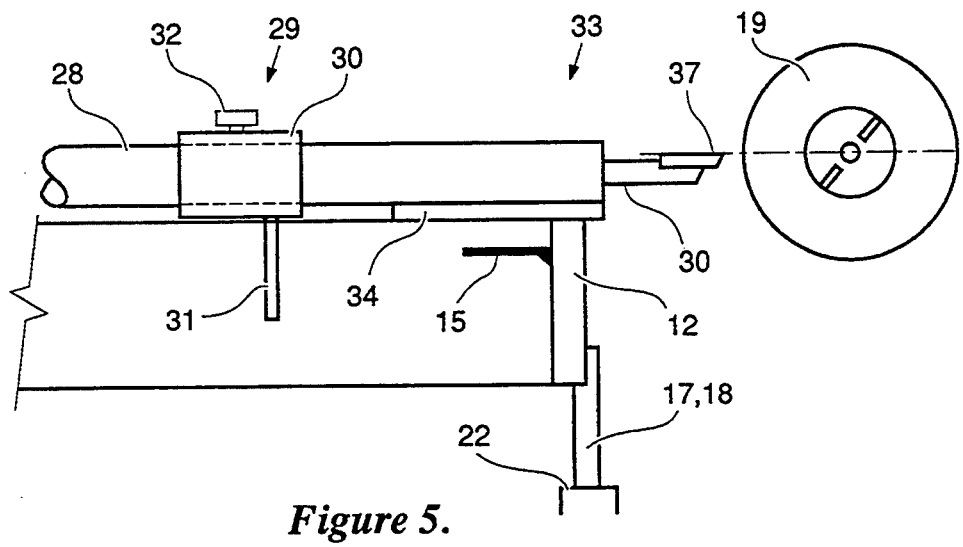
FIG. 5 is a partial side elevation of the arrangement illustrated in FIGS. 3 and 4.

Locating means in the form of a pair of mounting spigots 17, 18 are adjustably attached to tool rest 12 by means of fastening nuts 23, 24 which when tightened bear on the tool rest 12 in known manner. The locating means enable the guiding assembly to be mounted on a lathe in a manner subsequently to be described with reference to FIGS. 3 to 5.

As illustrated in these Figures a lathe bed 21 supports a headstock 19 and a tailstock 20 in known manner. A pair of tool rest holders 22 are adjustably and fixedly attached to the lathe bed 21 in known manner. The mounting spigots 17 and 18 are received in apertures in the tool rest holders 22 and can be adjustably clamped therein. The adjustable mounting of the spigot mountings 17 and 18 with respect to the tool rest 12, the adjustable mounting of the tool rest holders 22 with respect to the lathe bench 21, and the adjustable mounting of the spigot mountings 17 and 18 within the tool rest holders 22 results in the positioning of the guiding assembly relative to a workpiece in the lathe or to the lathe axis being infinitely variable.

As is best seen in FIGS. 1 and 2, cutting tool 27 for use with the guide assembly 11 includes elongated body means in the form of a cylindrical shaft 28. The cutting tool 27 includes a handle 48 releasably mounted at one end of the cylindrical shaft 28 by screw means 49 and a cutting tip 37 mountable at the other end of the shaft, either in the case of the embodiment illustrated in FIG. 1 by means of grub screw 36 in a recess in the elongated shaft 28, or in the embodiment of FIG. 2 the cutting tip 37 is mounted in a cutting tip holder 38 which is releasably mounted in the mounting head 33. The mounting head 33 is releasably mounted on the elongated shaft 28 by means of grub screw 41.

The cutting tool 27 is supported on the tool rest 12 adjacent to cutting tip 37 by planar abutment means in the form of a flat shoe 34. Shoe 34 forms part of the cutting tool 27, in the case of the embodiment of FIG. 1 by fixture to the distal end of the elongated shaft 28, or in the case of the embodiment of FIG. 2 by fixture to the cutting tip mounting head 33. The cutting tool 27 is mounted to move normal to the lathe axis by tool mounting means 42 in the form of a sleeve member 43 which receives the elongated shaft 28 in a free sliding fit. As illustrated in FIG. 2 the sleeve 43 may be a split sleeve adjustable by means of grub screws 46 to accommodate wear in either the sleeve means 43 or the elongated shaft 28 as a result of protracted use. The tool mounting means 42 is constrained for free sliding movement in a longitudinal direction relative to a workpiece along guide means 13 by means of a second sleeve member 44 arranged at right angles to the first sleeve member 43. With reference to FIG. 2, it will be seen that in a manner similar to that described with reference to sleeve 43, sleeve 44 may also be split and be adjustable by means of grub screws 45.

A follower 29 is adjustably mounted on the elongated shaft 28 by means of a grub screw 32. The follower means 29 include a sleeve member 30 and a stylus or finger 31 depending therefrom in a manner enabling the follower 29 to engage and follow a template 16 located in the guiding assembly 11 in the manner illustrated in FIG. 1. Rotational movement of the follower 29 with respect to the cylindrical shaft 28 may be prevented by a key-way (not shown) in the cylindrical shaft 28.

As can be seen in FIG. 2 a transparent shield 47 is releasably positionable in a slot adjacent to the cutting tip 37.

In use the cutting tool 27 is assembled in the guiding assembly 11 which is then located by means of mounting spigots 17, 18 in the tool rest holders 22 with the mounting spigot locking bolts 23, 24 loose. With the abutment shoe 34 resting on the rest 12, the cutting tip height is adjusted to coincide with both the live and dead centres of the lathe and the mounting spigots 17 and 18 clamped within the tool rest holders. Mounting spigot locking bolts 23, 24 are then tightened. Further adjustment of the tool rest holders 22 in a transverse direction to the centre line of the lathe enables the guiding assembly 11 to be positioned relative to the centre line with the tool rest 12 parallel thereto. The distance between the tool rest 12 and the lathe centre line can be adjusted to suit individual jobs in accordance with the dimensions of the billet to be turned. When the billet of timber to be turned is positioned in the lathe the desired template 16 is fitted in the guiding assembly. Either a flat template 16 is mounted on template mounting means 15 or an actual article to be replicated is positioned in the supports 25.

To fix the follower 29 on the cylindrical shaft 28, the cutting tip 37 or the cutting tip holder 38 is first fixedly positioned to its maximum extent within the cutting tool. Cutting tool 27 is then slid within the mounting means 42 towards the workpiece and a gap of approximately 20 mm is left between the cutting tip 37 and the face of the workpiece. The follower 29 is then slid over the cylindrical shaft 28 to contact the template 16 at the position of its largest diameter and the locking screw 32 tightened with the follower in this position. The cutting tip 37 or the cutting tip holder 38 as is appropriate, is then moved out to within approximately 5 mm of the billet and tightened by means of grub screw 36. This enables a roughing cut to be made approximately 5 mm over the desired finished size. The cutting tip is then moved outwardly to contact the face of the billet on the remaining squares at the setting point and the finishing cut is then taken at a higher lathe speed and slower feed rate to provide a good finish.

During use the cutting tool is controlled manually in movements both along the workpiece and to and from the workpiece in a manner providing the "hands-on" feel important to craftsmen and unavailable with automatic and semi-automatic equipment. The cutting tool 27 is restrained from pivoting about guide bar 13 by the application of downward pressure on the cutting tool which causes the cutting tool to move steadily with the shoe 34 bearing on the upper surface 50 of the tool rest 12.

The above illustrative example has been given with reference to cutting when the cutting tool moves in a longitudinal direction as in the production of spindles or the like supported along the length of the lathe in both the lathe headstock and tailstock. However it will be appreciated that the guiding assembly is equally adaptable to provide cutting by movement of the cutting tool in a transverse direction across the face of a workpiece held in the headstock for the production of bowls or the like. Furthermore the guiding assembly may be used to guide a router or the like to form or replicate fluting in a workpiece.

It will be realised that the guiding assembly in accordance with the present invention enables an operator to retain the "hands-on" feel of traditional woodturning, and because firm control is provided relatively inexperienced operators are able to turn and/or replicate complicated shapes with comparative ease. The positive control provided also facilitates the turning of wood both with and against the grain and enables metal or other materials to be turned in a woodturning lathe. The guiding assembly also facilitates woodturning by disadvantaged or disabled operators, ie sight-impaired operators and operators with shaking or tremors.

It will of course be realised that whilst the above has been given by way of an illustrative example of this invention, all such and other modifications and variations hereto, as would be apparent to persons skilled in the art, are deemed to fall within the broad scope and ambit of this invention as is hereinafter claimed.

I claim:

1. A retrofit kit for a lathe, the kit comprising:

a manually controlled cutting tool having a longitudinal axis, the manually controlled cutting tool including restraining means for restraining rotation of the cutting tool about the Longitudinal axis of the cutting tool, the restraining means being in the form of a flat shoe; and a guiding assembly for guiding the manually controlled cutting tool relative to a rotational axis of the lathe, said guiding assembly including:

a tool rest extending parallel to the rotational axis of the lathe, the flat shoe of the manually controlled cutting tool seating on the tool rest to restrain rotation of the cutting tool about its longitudinal axis during use;

tool mounting means for mounting the manually controlled cutting tool for free sliding movement across the tool rest normal to the rotational axis of the lathe, the tool mounting means being in the form of a tool mounting sleeve having a longitudinal axis, the longitudinal axis of the tool mounting sleeve being normal to the rotational axis of the lathe; and guide means for guiding the tool mounting means for free sliding movement parallel to the rotational axis of the lathe, the guide means including a guide sleeve having a longitudinal axis which is parallel to the rotational axis of the lathe, and a guide shaft on which the guide sleeve is slidably mounted;

the tool mounting sleeve and guide sleeve being integral, and the tool rest and guide shaft constituting opposed frame members of a substantially rectangular frame which is adapted to be removably mounted with respect to the lathe.

2. A retrofit kit for a lathe as defined in claim 1, wherein the tool rest includes integral side arms extending horizontally and normally with respect to the rotational axis of the lathe, the guide shaft extending between the side arms.

3. A retrofit kit as defined in claim 1, wherein the manually controlled cutting tool is maintained in a horizontal plane containing the rotational axis of the lathe in use.

4. A retrofit kit as defined in claim 1, wherein the manually controlled cutting tool includes follower means for following a template, and wherein the follower means is selectively adjustable with respect to the tip of the manually controlled cutting tool.

5. A retrofit kit as claimed in claim 1, further comprising a template mounting means for mounting a template intermediate said tool rest and said guide means.

6. A retrofit kit as claimed in claim 1 further comprising follower means operatively associated with the cutting tool for following a template.

7. A retrofit kit as claimed in claim 6, wherein the position of said follower means relative to the cutting tip of said cutting tool is selectively adjustable.

8. A retrofit kit as claimed in claim 1, further comprising locating means for fixedly and releasably locating said guiding assembly relative to the lathe.

9. A retrofit kit as claimed in claim 8, wherein said locating means includes a plurality of mounting spigots.

10. A guiding assembly for guiding a manually controlled cutting tool relative to a rotational axis of a lathe to replicate a predetermined shape, said guiding assembly including:

a tool rest extending parallel to the rotational axis of the lathe;

tool mounting means for mounting a cutting tool for free sliding movement across said rest normal to the rotational axis of the lathe, said tool mounting means comprising a tool mounting sleeve;

follower means operatively associated with said cutting tool for following a template; and guide means for guiding said tool mounting means for free sliding movement parallel to the rotational axis of the lathe, said guide means comprising a guide sleeve having a longitudinal axis which is parallel to the rotational axis of the lathe, and a guide shaft on which the guide sleeve is slidably mounted, the tool mounting sleeve being fixed to the guide sleeve.

11. A guiding assembly as claimed in claim 10 wherein said cutting tool comprises an elongated body means slidably received within said tool mounting means, and wherein said follower means is adjustably mounted on said elongated body means, said cutting tool further comprising a handle, a cutter bit, and releasable holding means for releasably holding said cutter bit.

12. A guiding assembly as claimed in claim 11, further comprising restraining means for restraining rotation of said cutting tool when said cutting tool is seated on the tool rest.

13. A guiding assembly as claimed in claim 12, wherein said restraining means is in the form of a substantially flat shoe.

14. A method of replicating a predetermined shape, said method comprising the steps of providing a guiding assembly for guiding a manually controlled cutting tool relative to a rotational axis of a lathe said guiding assembly including a tool rest extending parallel to the rotational axis of the lathe, tool mounting means for mounting the cutting tool for free sliding movement across the rest normal to the rotational axis of the lathe, said tool mounting means comprising a tool mounting sleeve, follower means operatively associated with the cutting tool for following a template, and guide means for guiding the tool mounting means for free sliding movement parallel to the rotational axis of the lathe, the guide means comprising a guide sleeve having a longitudinal axis which is parallel to the rotational axis of the lathe, and a guide shaft on which the guide sleeve is slidably mounted, the tool mounting sleeve being fixed to the guide sleeve;

fixedly locating a template in said guiding assembly, said template having an outline corresponding to the predetermined shape;

fixedly positioning a workpiece in the lathe;

operating the lathe to rotate the workpiece; and manually guiding the cutting tool in said guiding assembly so that said follower means traces the outline of said template.

* * * * *